May 30, 1950 G. E. FROST 2,509,222
TORQUE RESPONSIVE DEVICE
Filed Nov. 9, 1944
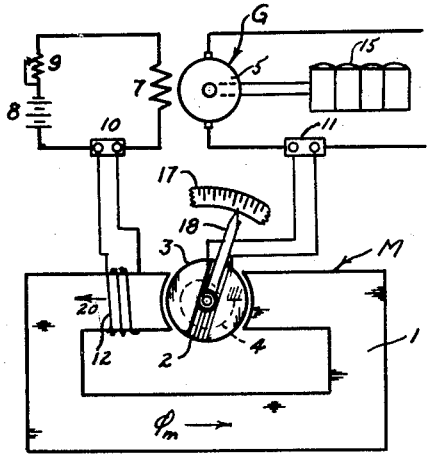
FIG. 1
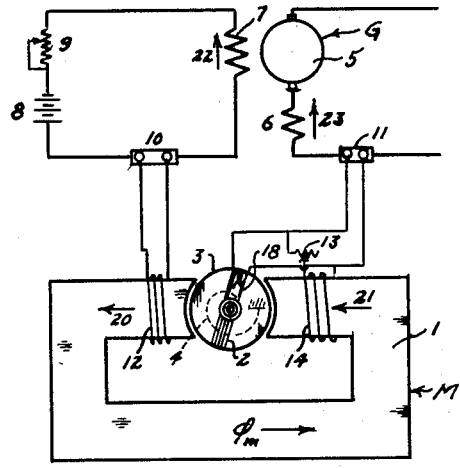
FIG. 3
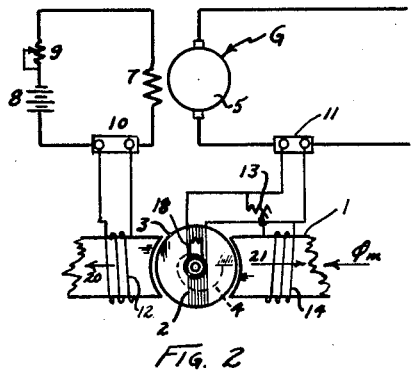
FIG. 2
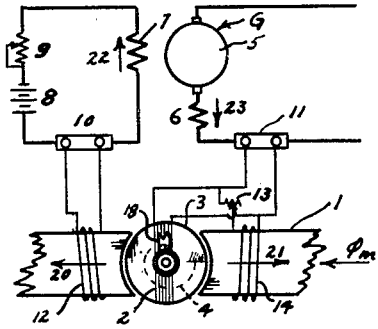
FIG. 4
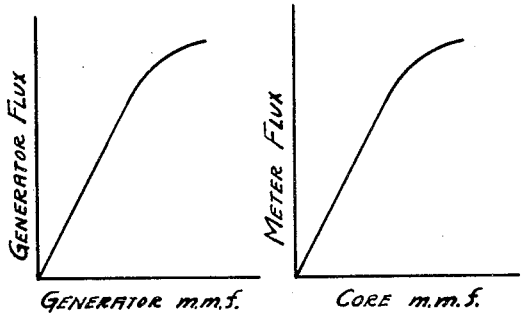
FIG. 5a     FIG. 5b
FIG. 6
GEORGE E. FROST INVENTOR.
BY *H. Helvestine*
ATTORNEY Patented May 30, 1950

2,509,222

UNITED STATES PATENT OFFICE 2,509,222

TORQUE RESPONSIVE DEVICE

George E. Frost, Arlington, Va.

Application November 9, 1944, Serial No. 562,638

13 Claims. (Cl. 73—134)

(Granted under the act of March 3, 1883, as amended April 30, 1928; 370 O. G. 757)

Many electric generators are driven by prime movers having a substantially constant torque characteristic throughout their normal range of operating speeds. Typical of such prime movers are the gasoline engine, Diesel engine, and certain types of electric motors. With these prime movers a device responsive to torque can perform a variety of useful functions including: control of fuel input to the prime mover, providing an indication of troque for the benefit of the operator, decreasing the generator load when allowable torque is exceeded, and many others.

Mechanical torque responsive devices are not suitable for installation in most generating plants because they are cumbersome, expensive and inaccurate. Furthermore, they do not provide an electric indication of torque suitable for operation of electric relays. Mechanical torque measuring devices also have considerable inertia and fail to respond accurately to rapid changes of torque. It is therefore highly desirable to have a torque responsive device entirely electric in operation and actuated by electrical conditions on the generator rather than mechanical conditions in the prime mover.

An electrical torque measuring device is useful in connection with other dynamo-electric machines as well as generators. For instance, it may be used on motors to determine load torque requirements. As the temperature rise of a dynamo-electric machine is approximately proportional to the torque it is developing or absorbing, a torque measuring device may be used to indicate the relative value of armature heating.

It is therefore a general object of this invention to provide means directly responsive to the torque of a prime mover driving an electric generator.

It is also an object of this invention to provide a torque responsive device suitable for use in all types of dynamo-electric machinery of the direct current type.

A further object of this invention is to accomplish the desired result electrically and in a manner readily adaptable for use on electric instruments or relays.

A further object of this invention is to provide a device accurately indicating the prime mover torque irrespective of the effects of magnetic saturation, armature reaction, and the various field windings on the machine.

Finally, it is an object of my invention to secure these results in a simple and convenient manner using equipment having a high degree of reliability.

In describing in detail my novel torque responsive device, which is considered to be an improvement over the device shown in U. S. Patent No. 1,795,905 issued March 10, 1931, reference will be made to the attached drawings. In the drawings:

Figure 1 is a view of a torque responsive device constructed in accordance with the principes of the present invention and applied to indicate the torque of a shunt wound direct current generator.

Figure 2 is a fragmentary view like Figure 1 but showing the torque responsive device applied to indicate the torque of a shunt-wound direct current generator having substantial armature reaction.

Figure 3 is a fragmentary view like Figure 1 but showing the torque responsive device applied to indicate the torque of a cumulative compound wound direct current generator.

Figure 4 is a fragmentary view like Figure 1 but showing application of the torque responsive device to a differentially compound wound direct current generator.

Figures 5a and 5b are charts illustrating the correlation between the effective saturation curve of the generator to which the torque responsive device of the present invention is applied and the effective saturation curve of the core portion of the torque responsive device.

Figure 6 is a fragmentary view of the core of the torque responsive device of the present invention and illustrating one method of adopting it for use with a direct current machine having an effective saturation curve departing substantially from a straight line.

As shown in Figure 1, the torque responsive device indicated generally at M comprises a magnetic core portion 1 defining a magnetic flux path separate from the direct current machine indicated generally at G. A rotor 3 sustains the coil 2 in position to link the magnetic flux encircling the flux path defined by core 1. A spring 4 is provided to oppose rotations of the rotor 3.

It is well known that the torque of a direct current machine is proportional to the product of flux in the magnetic field and current in the armature conductors.

(1) $$T = k\phi i_a$$

where $\phi$ and $i_a$ are the machine flux and armature current respectively.

Similarly, if movable coil 2 be mounted in the magnetic field $\phi_m$, as shown in Fig. 1, torque will be exerted on the coil 2 of a magnitude proportional to the field flux, $\phi_m$, and the current, $i_m$, passing through the coil.

(2) $$T_m = k_m \phi_m i_m$$

By placing restraining spring 4 on the rotor 3, counter torque proportional to the deflection of the coil is produced. Since the coil will come to rest where the torque due to the flux and current equals the counter torque of the spring, the deflection, D, of the coil will be proportional to the product of field flux and coil current.

(3) $$D = k_1 \phi_m i_m$$

if the flux, $\phi_m$, in the core is made proportional to the flux in the machine and the current, $i_m$, in the movable coil is made proportional to machine armature current, deflection will be proportional to the products of these two qualities.

(4) $$D = k_2 \phi i_a$$

But, from Equation 1, the product of machine flux and armature current is equal to the torque on the machine. Hence:

(5) $$D = k_5 T$$

The deflection of the coil is therefore proportional to the machine torque.

The above relations are true provided magnetizing effects and rotation of coil 2, Fig. 1, do not influence the flux passing through it. I avoid magnetizing difficulties by using a relatively weak spring, 4, a light rotatable structure, and a large air gap so that the ampere turns required to achieve the meter torque for maximum displacement are small compared with the ampere turns in the remainder of the magnetic path. The magnetomotive force produced by the coil is thereby made negligible with respect to the magnetomotive force in the core. To avoid change in flux linking the meter coil due to its own rotation I make the coil 2 of such size that it can turn through the maximum desired angle without altering the flux linked by the coil.

The construction of core, 1, may be of any of the types well known in the art, for instance, the cross-section may be round, square, rectangular, or any other shape as most convenient in any particular design. The core should preferably be of laminated steel but other core materials such as cast iron will work satisfactorily. Rotor 3 is also preferably made up of a stack of steel laminations.

In the view of Figure 1, the torque responsive device of the present invention is shown as applied to indicate the counter-torque of a shunt wound D.-C. generator. For this purpose the rotor 3 is provided with a pointer 18 which cooperates with the scale 17 to indicate the degree of rotation of the rotor.

In order to establish a magnetic flux $\phi_m$ in the core 1 in accord with the flux effective in generating voltage in the armature 5 of generator G, a winding 12 is placed on the core 1 as indicated. The terminals of this winding are connected to the shunt resistance 10 which carries the current flow in the shunt field winding 7 of the generator G and hence develops a voltage across winding 12 in accord with the shunt field current of the machine.

Current flow in shunt field winding 7 is derived from source 8 through the circuit which may be traced through source 8, shunt resistance 10, shunt field winding 7, and adjustable resistance 9.

The winding 2 of the rotor 3 is connected to the shunt resistance 11 which carries the armature current of the generator G. Thus current is caused to flow in the winding 2 in accord with the armature current of generator G.

Since the current flow through winding 12 sets up flux $\phi_m$ in the core 1 in accord with the flux of the generator G and the current in coil 2 links that flux and is in accord with the armature current flow of generator G, the torque exerted on rotor 3 varies in accordance with the torque of the generator G. The spring 4 is accordingly deflected in accord with the generator torque and that torque may be read on an appropriate scale 17.

In the drawing at Figure 1, the generator G is as driven by a Diesel engine 15.

Figure 2 shows the torque responsive device of the present invention adapted to measure the torque of a D.-C. generator having substantial armature reaction. This mechanism differs from that of Figure 1 in that the additional winding 14 is provided on core 1 and is connected through adjustable resistance 13 to the shunt resistance 11. Since the voltage drop across the latter resistor varies in accord with armature current of generator G, the current flow through winding 14 varies in accord with armature current.

Since the armature reaction, or demagnetizing effect of armature current, acts in opposition to the field current flow in creating flux in generator G, the winding 14 is wound to oppose the winding 12 in setting up flux $\phi_m$ in the core 1. This effect is indicated in Figure 2 of the drawing by the opposed arrows 20 and 21 showing the directions of magnetomotive force of the coils 12 and 14, respectively.

In the mechanism of Figure 2, the adjustable resistance 13 is varied to the value at which the relative contributions of windings 12 and 14 to the flux $\phi_m$ are in accord with the relative contributions of the field current flowing through field winding 7 of the generator G and the armature current flowing through the armature winding 5 thereof to the magnetomotive force of the generator.

Expressed mathematically, resistance 13 is adjusted until:

(6) $$\frac{m.m.f._{12}}{m.m.f._f} = \frac{m.m.f._{14}}{m.m.f._a}$$

where:

m. m. f.$_{12}$ is the magnetomotive force due to current in coil 12.

m. m. f.$_f$ is the magnetomotive force due to generator shunt field current.

m. m. f.$_{14}$ is the magnetomotive force due to current in coil 14.

m. m. f.$_a$ is the direct axis component of magnetomotive force due to armature current flowing in the armature.

Figure 3 shows the application of the torque responsive device of the present invention to a generator G having a cumulative compound field winding 6. The cumulative compound winding connection is indicated by the arrows 22 and 23 representing the magnetomotive forces due to current flow in the shunt and series field windings respectively and which have like orientations on the drawing. The connections in this case are like those of Figure 2 but coil 14 is wound in the opposite direction to produce magnetomotive force in aiding relationship with that of winding 12 as indicated by the like orientations of arrows 20 and 21 representing the directions of the magnetomotive forces of windings 12 and 14 respectively.

In the mechanism of Figure 3, the resistance 13 is adjusted until the magnetomotive forces produced in core 1 by the windings 12 and 14 are in accord with the relative contributions of the shunt field current and armature current respectively, to the total magnetomotive force of the machine. The flux in core 1 linked by the coil 2 is then proportional to the flux in generator G and the torque produced by current flow in that coil is proportional to the generator torque.

Figure 4 shows the torque responsive device of the present invention as applied to a differential compound wound D.-C. generator. The connections in this case are like those of Figure 2 in order that current flow through the winding 14 shall decrease the flux $\phi_m$ in core 1 in the same manner that armature current flow in the differential field winding decreases the generator flux. These opposing magnetomotive forces in the machine and in the torque responsive device are indicated by the opposed arrows 22 and 23 and 20 and 21, respectively.

In the structure of Figure 4, the resistance 13 is adjusted until the magnetomotive forces of windings 12 and 14 are in accord with the relative contributions of shunt field current flow and armature current flow to the total magnetomotive force of the generator G.

The foregoing description is based on the premise that successive increments of magnetomotive force on core 1 produce variations of flux $\phi_m$ in accord with the contributions of the corresponding successive increments of field magnetomotive force in the machine to the machine flux. In other words, the core 1 defines a magnetic flux path having an effective saturation curve substantially like that of the generator G. Figures 5a and 5b show a pair of characteristics of this type for the specific case of a generator having an effective saturation curve departing to a substantial degree from a straight line characteristic in the upper range of total field magnetomotive force. As indicated, the core 1 is designed to have a similar degree of departure from a straight line characteristic in the range of magnetomotive force values corresponding to this range of total field magnetomotive force. If the generator has a greater or lesser degree of departure from a straight line characteristic in the range of operation, or follows a straight line characteristic, the effective saturation curve of the core 1 is chosen accordingly to give an effective saturation curve like that of the machine.

If the effective saturation curve of the generator departs from a straight line to a substantial degree as, for example, as is shown in Figure 5a, the cross section and material of core 1 may be chosen to achieve the characteristic required. Alternatively, the core may be provided with a narrow saturating portion 19, Figure 6, to saturate and provide the necessary departure from a straight line characteristic.

Other forms of my torque responsive device for use in machines of different types will be evident to one skilled in the electrical art. For instance, if the machine has an additional control field producing magnetomotive force in the direct axis, it would be apparent that the object and spirit of my invention can be carried out by providing a suitable additional coil on core 1.

In the specification, I have used the term "direct axis" to denote that path of the generator wherein flux generates voltage in the armature. I use this term to distinguish the cross-axis or quadrature axis wherein flux may exist and produce no voltage in the armature.

The term "dynamo-electric machine" as used herein is intended to cover all types of direct current machinery having a current carrying armature and a field structure.

I do not propose that my invention be limited to any one application of my torque responsive device, but instead broadly claim it for use as a torque indicator or meter, relay, or any other form apparent to one skilled in the art. I also claim its use in the measurement of torque on electric motors as well as generators.

The invention described herein may be manufactured and used by or for the Government of the United States of America for governmental purposes without the payment of any royalties thereon or therefor.

I claim:

1. A mechanism to measure the torque of a direct current machine of the type having an armature and a field winding, said mechanism including a core defining a magnetic flux path separate from said machine; said core having an effective saturation curve substantially like that of said machine; a winding encircling said flux path; means to produce electromotive force across said last winding in accord with the current flow in said field winding; a movable coil disposed to be linked with the flux in said core; yielding means restraining motion of said coil; and means for causing current flow in said coil in accord with the armature current of said machine, the magnetomotive force of said coil being negligible as compared with the magnetomotive force of said last winding.

2. A mechanism to measure the torque of a direct current machine of the type having an armature and a plurality of field windings, said mechanism including a core defining a magnetic flux path separate from said machine and having an effective saturation curve substantially like that of said machine; windings about said core corresponding to said field windings; means to produce electromotive force across each of said last windings in accord with the current flow in the corresponding field winding, said means being proportioned to cause each of said last windings to produce magnetomotive force in said core in accord with the relative contribution of the corresponding winding to the magnetomotive force of said machine, thereby to produce flux in said core in accord with the flux intercepted by the armature winding of said machine; a movable coil disposed to be linked by the flux of said core; yielding means restraining motion of said coil; and means for causing current flow through said coil in accord with the armature current of said machine.

3. A mechanism to measure the torque of a direct current machine of the type having an armature and two field windings, said mechanism including a core defining a magnetic flux path separate from said machine and having an effective saturation curve substantially like that of said machine; a pair of windings about said core; means to produce electromotive force across each of said windings in accord with the current flow in the corresponding field winding, said means being proportioned to cause each of said last windings to produce magnetomotive force in said core in accord with the relative contribution of the corresponding winding to the magnetomotive force of said machine, thereby to produce flux in said core in accord with the flux of said machine; a movable coil disposed to be linked with the flux of said core; yielding means restraining motion of said coil; and means for causing current flow through said coil in accord with the armature current of said machine.

4. A mechanism to measure the torque of a direct current machine of the type having an armature and a field winding and in which the armature exerts substantial magnetomotive force during normal operation, said mechanism including a core defining a magnetic flux path separate from said machine and having an effective saturation curve substantially like that of said machine; a pair of windings about said core; means to produce electromotive force across one of said windings in accord with the armature current of said machine and across the other of said windings in accord with the current in the field winding of said machine, said means being proportioned to cause the relative magnetomotive forces of said windings to be in accord with the relative contributions of the field winding of said machine and the armature of said machine to the magnetomotive thereof, thereby to produce flux in said core in accord with the flux of said machine; a movable coil disposed to be linked with the flux of said core; yielding means restraining motion of said coil; and means for causing current flow through said coil in accord with the armature current of said machine.

5. A mechanism to measure the torque of a direct current machine of the type having an armature, a shunt field winding, and a cumulative compound field winding, said mechanism including a core defining a magnetic flux path separate from said machine and having an effective saturation curve substantially like that of said machine; a pair of windings about said core; means to produce electromotive force across one of said windings in accord with the armature current of said machine and across the other of said windings in accord with the current in the shunt field winding of said machine, said means being proportioned to cause the relative magnetomotive forces of said windings to act cumulatively and in accord with the relative contributions of shunt field current flow and armature current flow to the total magnetomotive force of said machine, thereby to produce flux in said core in accord with the flux of said machine; a movable coil disposed to be linked with the flux of said core; yielding means restraining motion of said coil; and means for causing current flow through said coil in proportion to the armature current of said machine.

6. A mechanism to measure the torque of a direct current machine of the type having an armature, a shunt field winding, and a differential compound field winding, said mechanism including a core defining a magnetic flux path separate from said machine and having an effective saturation curve substantially like that of said machine; a pair of windings wound about said core; means to produce electromotive force across one of said windings in accord with the armature current of said machine and across the other of said windings in accord with the current in the shunt field winding of said machine, said means being proportioned to cause the relative magnetomotive forces of said last windings to act differentially and in accord with the relative contributions of shunt field current flow and armature current flow to the total magnetomotive force of said machine, thereby to produce flux in said core in accord with the flux of said machine; a movable coil disposed to be linked with the flux of said core; yielding means restraining motion of said coil; and means for causing current flow through said coil in proportion to the armature current of said machine.

7. A mechanism to measure the torque of a direct current machine of the type having an armature and a field winding and having an effective saturation curve departing substantially from a straight line characteristic, said mechanism including a core defining a magnetic flux path separate from said machine; said core having an effective saturation curve departing from a straight line characteristic to substantially the same degree as the effective saturation curve of said machine; a winding encircling said flux path; means to produce an electromotive force across said last winding in accord with the current flow in said field winding; a movable coil disposed to be linked with the flux of said core; yielding means restraining motion of said coil; means for causing current flow in said coil in accord with the armature current of said machine, the magnetomotive force of said coil being negligible as compared with the magnetomotive force of said last winding.

8. A mechanism to measure the torque of a direct current machine of the type having an armature and a plurality of field windings and having an effective saturation curve departing substantially from a straight line characteristic, said mechanism including a core defining a magnetic flux path separate from said machine and having an effective saturation curve departing from a straight line characteristic to substantially the same degree as the effective saturation curve of said machine; windings about said core corresponding to said field windings; means to produce electromotive force across each of said last windings in accord with the current flow in the corresponding field winding, said means being proportioned to cause each of said last windings to produce magnetomotive force in said core in accord with the relative contribution of the corresponding winding to the magnetomotive force of said machine, thereby to produce flux in said core in accord with the flux intercepted by the armature winding of said machine; a movable coil disposed to be linked by the flux of said core; yielding means restraining motion of said coil; and means for causing current flow through said coil in accord with the armature current of said machine.

9. A mechanism to measure the torque of a direct current machine of the type having an armature and two field windings and having an effective saturation curve departing substantially from a straight line characteristic, said mechanism including a core defining a magnetic flux path separate from said machine and having an effective saturation curve departing from a straight line characteristic to substantially the same degree as the effective saturation curve of said machine; a pair of windings about said core; means to produce electromotive force across each of said windings in accord with the current flow in the corresponding field winding, said means being proportioned to cause each of said last windings to produce magnetomotive force in said core in accord with the relative contribution of the corresponding windings to the magnetomotive force of said machine, thereby to produce flux in said core in accord with the flux of said machine; a movable coil disposed to be linked with the flux of said core; yielding means restraining motion of said coil; and means for causing current flow through said coil in accord with the armature current of said machine.

10. A mechanism to measure the torque of a direct current machine of the type having an armature and a field winding in which the armature exerts substantial magnetomotive force during normal operation and having an effective saturation curve departing substantially from a straight line characteristic, said mechanism including a core defining a magnetic flux path separate from said machine and having an effective saturation curve departing from a straight line characteristic to substantially the same degree as the effective saturation curve of said machine; a pair of windings about said core; means to produce electromotive force across one of said windings in accord with the armature current of said machine and across the other of said windings in accord with the current in the field winding of said machine, said means being proportioned to cause the relative magnetomotive forces of said windings to be in accord with the relative contributions of the field winding of said machine and the armature winding of said machine to the magnetomotive force thereof, thereby to produce flux in said core in accord with the flux of said machine; a movable coil disposed to be linked with the flux of said core; yielding means restraining motion of said coil; and means for causing current flow through said coil in accord with the armature current of said machine.

11. A mechanism to measure the torque of a direct current machine of the type having an armature, a shunt field winding, and a cumulative compound field winding, and having an effective saturation curve departing substantially from a straight line characteristic, said mechanism including a core defining a magnetic flux path separate from said machine and having an effective saturation curve departing from a straight line characteristic to substantially the same degree as the effective saturation curve of said machine; a pair of windings about said core; means to produce electromotive force across one of said windings in accord with the armature current of said machine and across the other of said windings in accord with the current in the shunt field winding of said machine, said means being proportioned to cause the relative magnetomotive forces of said windings to act cumulatively and in accord with the relative contributions of shunt field current flow and armature current flow to the total magnetomotive force of said machine, thereby to produce flux in said core in accord with the flux of said machine; a movable coil disposed to be linked with the flux of said core; yielding means restraining motion of said coil; and means for causing current flow through said coil in proportion to the armature current of said machine.

12. A mechanism to measure the torque of a direct current machine of the type having an armature, a shunt field winding, and a differential compound field winding, and having an effective saturation curve departing substantially from a straight line characteristic, said mechanism including a core defining a magnetic flux path separate from said machine and having an effective saturation curve departing from a straight line characteristic to substantially the same degree as the effective saturation curve of said machine; a pair of windings wound about said core; means to produce electromotive force across one of said windings in accord with the armature current of said machine and across the other of said windings in accord with the current in the shunt field winding of said machine, said means being proportioned to cause the relative magnetomotive forces of said last windings to act differentially and in accord with the relative contributions of shunt field current flow and armature current flow to the total magnetomotive force of said machine, thereby to produce flux in said core in accord with the flux of said machine; a movable coil disposed to be linked with the flux of said core; yielding means restraining motion of said coil; and means for causing current flow through said coil in proportion to the armature current of said machine.

13. A mechanism to measure the torque of a direct current machine of the type having an armature and a field winding and having an effective saturation curve departing substantially from a straight line characteristic, said mechanism including a core defining a magnetic flux path separate from said machine; said core having an effective saturation curve departing from a straight line characteristic to substantially the same degree as the effective saturation curve of said machine; a winding encircling said flux path; a movable coil disposed to be linked with the flux of said core; and yielding means restraining the motion of said coil.

GEORGE E. FROST.

REFERENCES CITED

The following references are of record in the file of this patent:

UNITED STATES PATENTS

| Number | Name | Date |
|---|---|---|
| 452,326 | Weston | May 12, 1891 |
| 698,682 | Duncan | Apr. 29, 1902 |
| 1,841,892 | Highfield | Jan. 19, 1932 |
| 1,942,920 | Fawkes | Jan. 9, 1934 |
| 2,028,374 | Anderson | Jan. 21, 1936 |
| 2,363,377 | Wrathall | Nov. 21, 1944 |
| 2,385,005 | Langer | Sept. 18, 1945 |

FOREIGN PATENTS

| Number | Country | Date |
|---|---|---|
| 282,722 | Germany | Mar. 17, 1915 |